Aug. 24, 1937.　　　L. L. MATANOVICH　　　2,090,690
KITCHEN KIT
Filed Dec. 20, 1934　　　5 Sheets-Sheet 2

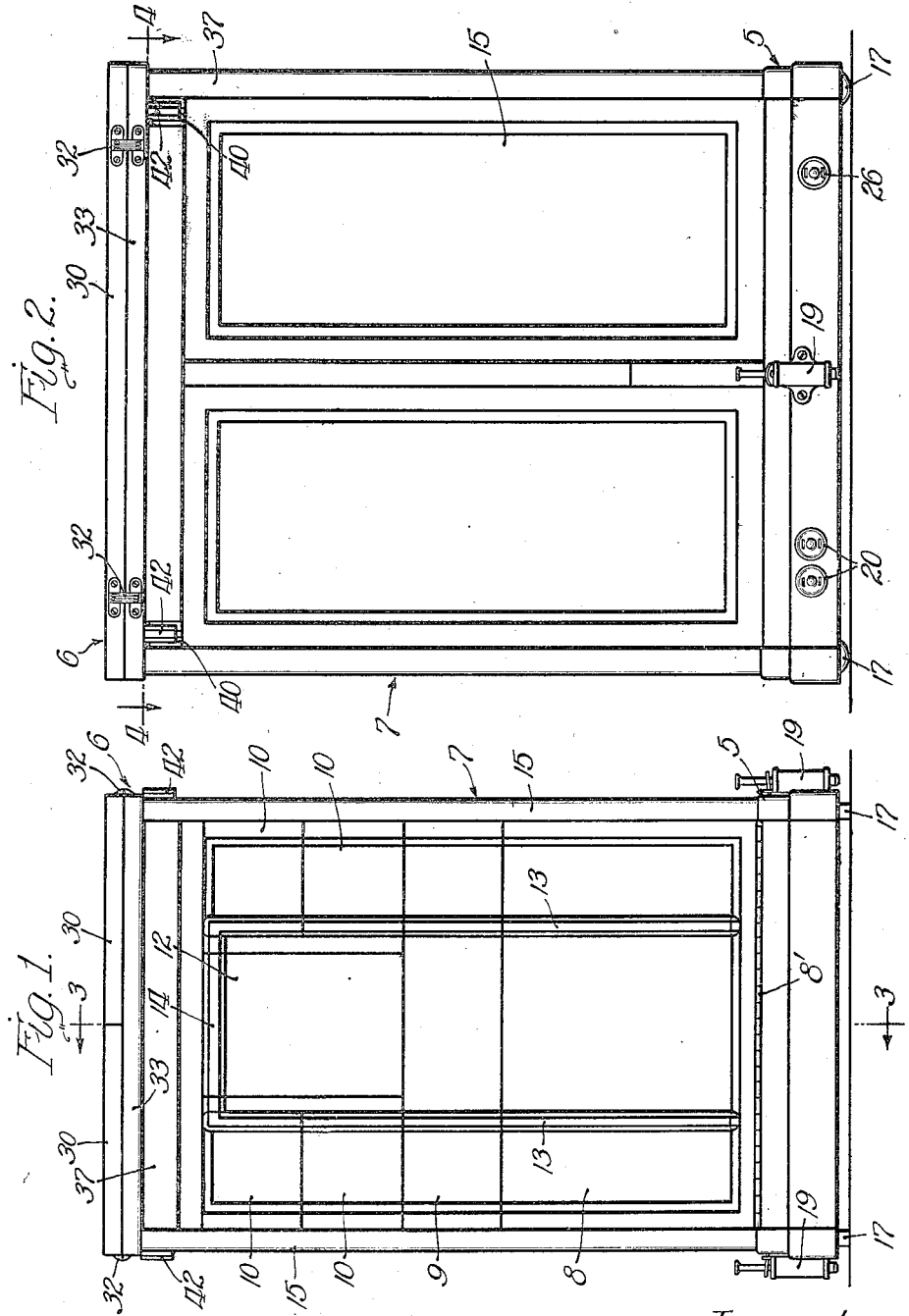

Inventor:
Louis L. Matanovich
By: Brown, Jackson, Boettcher & Dienner,
Attys.

Aug. 24, 1937.   L. L. MATANOVICH   2,090,690
KITCHEN KIT
Filed Dec. 20, 1934   5 Sheets-Sheet 3

Inventor:
Louis L. Matanovich
By: Brown, Jackson, Boettcher & Dienner,
Attys.

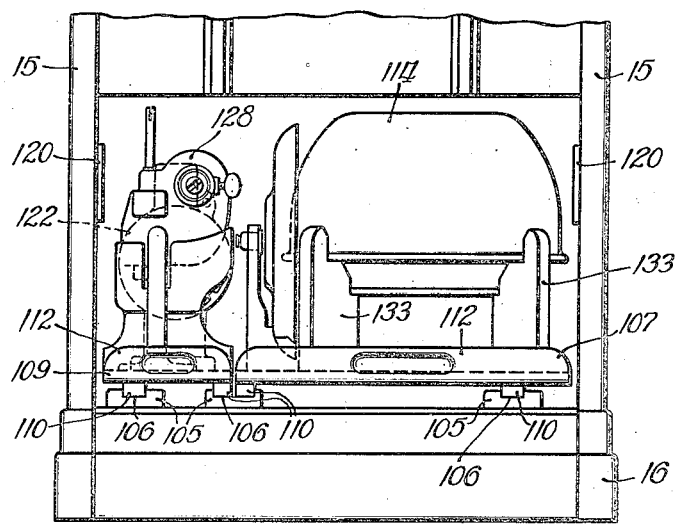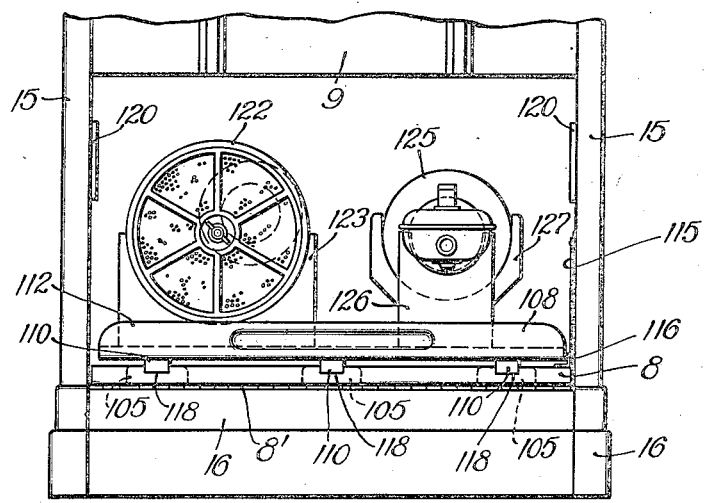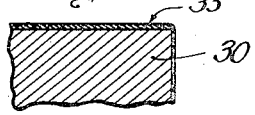

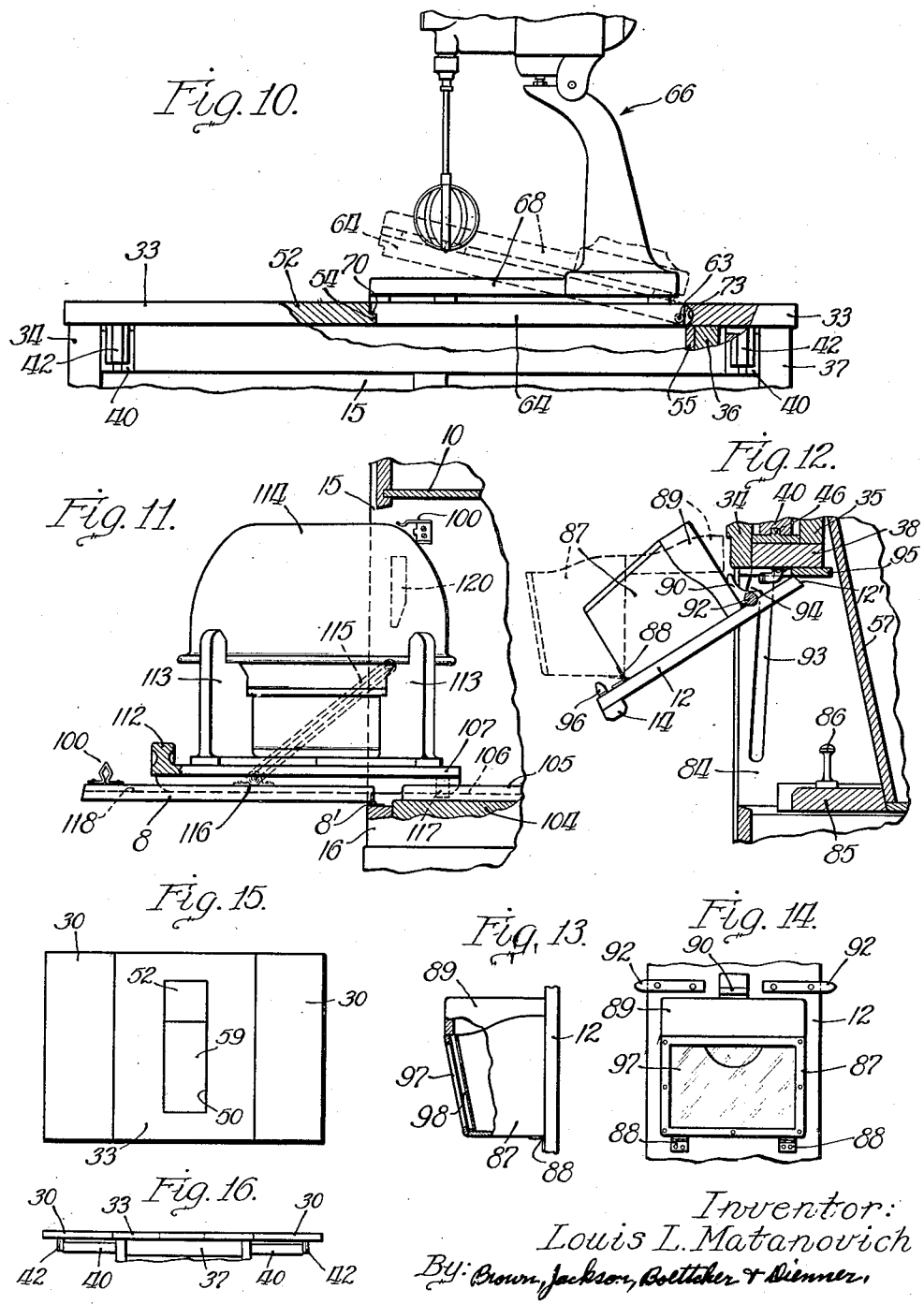

Patented Aug. 24, 1937

2,090,690

UNITED STATES PATENT OFFICE 2,090,690

KITCHEN KIT

Louis L. Matanovich, Chicago, Ill.

Application December 20, 1934, Serial No. 758,423

2 Claims. (Cl. 312—146)

This invention relates to kitchen kits or stands, and more particularly is directed to a stand or table for containing and supporting a power operated mixing and stirring device, with its accessory equipment.

The use of power operated devices of this type is well known, but such devices are usually rather large and, with their accessories, are quite bulky if it is necessary to store them in ordinary cabinets or the like. Further, such storage requires that considerable labor be involved in setting the devices up for operation. This lack of facility in the use of such devices has cut down their utility to a considerable extent, and full and advantageous use of such units has not been attained.

It is an object of the present invention to provide a kitchen stand which is of compact and sturdy construction, and which can be employed as a kitchen table when not in use as a stand for the power operated device. The stand is so arranged as to provide a central well in which the device is supported, and from which it may be raised when it is desired to use the same. The various appliances which are to be used with the device are so mounted within the stand as to facilitate use thereof with the device, and ancillary devices, such as means for supporting recipes or memo pads, and the like, in proper position to be available instantly during the use of the device, are provided within the stand.

The stand is designed to provide a neat and attractive article of furniture in the kitchen, which may readily be maintained in a clean and sanitary condition, and is mounted on casters for movement to any desired location, with means for locking it in the desired location so that it cannot be inadvertently moved therefrom. Further, suitable adjustable means are provided for connecting the stand to a source of electrical current, in order to supply the necessary current for the operation of the mixing device.

Another feature of the present invention is the provision of a stand so constructed as to provide a maximum amount of drawer or storage space commensurate with the size of the stand and the number of appliances and devices mounted therein.

A further feature of the invention is the provision of a stand of this type which may be readily converted into a table suitable for use as a breakfast table or the like, with a closable center well within which is disposed the power operated device, the positioning of the device upon the table being facilitated when it is desired to convert the stand into a kitchen work table for cooking purposes. The center well is provided, at opposite sides thereof, with compartments containing removable closure members upon which are supported various appurtenances incidental to the work being carried on on the work table.

The appliances adapted for use with the power operated device are preferably mounted in concealed position within the stand, and are adapted to be moved outwardly thereof to provide ready access thereto whenever they are desired for use with the device.

Other objects and advantages of the present invention will appear more fully from the following detailed description, which, taken in connection with the accompanying drawings, will disclose to those skilled in the art the particular construction and operation of a preferred form of the present invention.

In the drawings:

Figure 1 is an end elevational view of a stand embodying the present invention;

Figure 2 is a side elevational view of the stand;

Figure 7 is a partial elevational view of one end of the stand;

Figure 8 is a similar view of the opposite end of the stand;

Figure 9 is a detail sectional view showing the top surface construction of the table;

Figure 10 is a detail sectional view, showing the manner in which the power operated device is supported in operative position;

Figure 11 is a detail elevational view, partly in section, showing the manner in which the appliances are moved outwardly of the stand;

Figure 12 is a detail view of the manner in which the recipe compartment is opened for access to the recipe container;

Figure 13 is a detail view of the recipe container, partly in section;

Figure 14 is a front view of the recipe container mounted upon the hinged door of one of the compartments;

Figure 15 is a top plan view, diagrammatic in form, showing the manner in which the device is employed as a table; and Figure 16 is an end elevational view of the structure shown in Figure 15.

Figure 3:
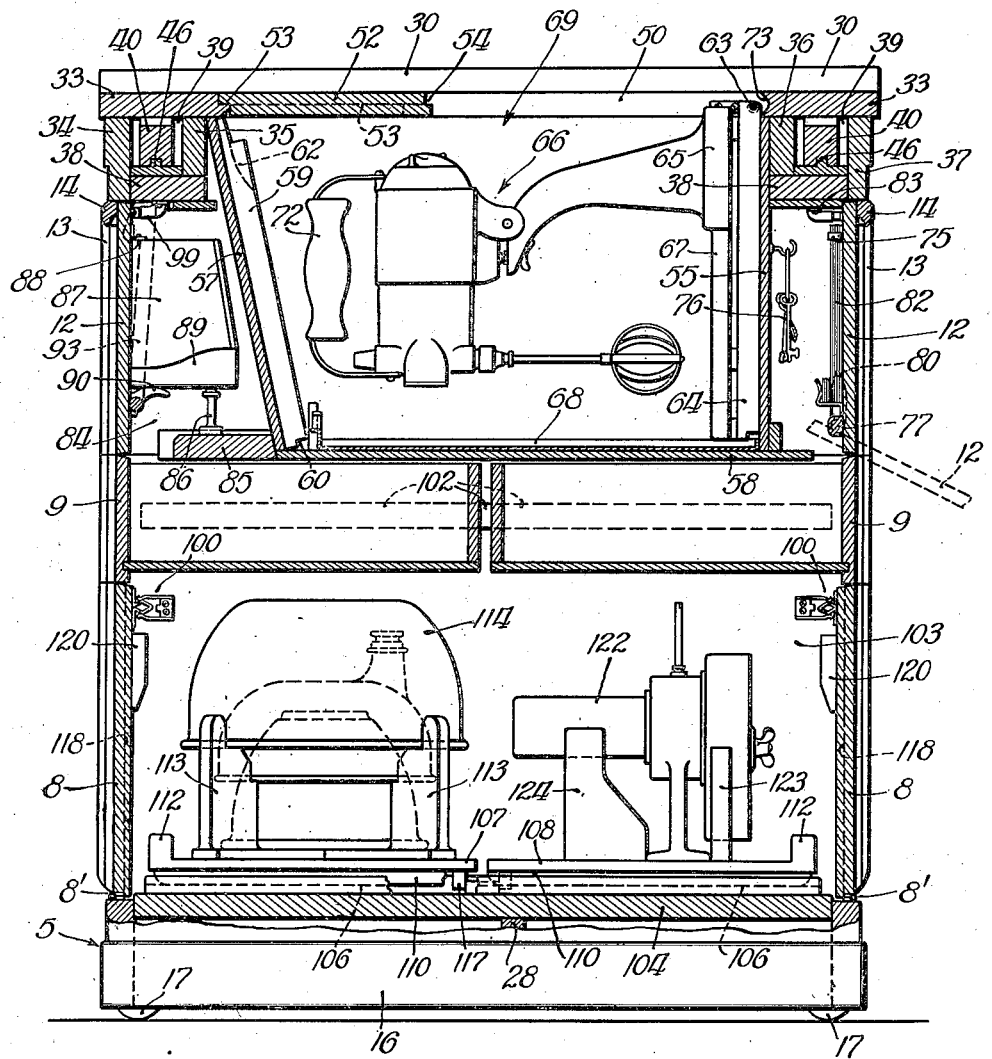
Figure 3 is a vertical sectional view, taken substantially on the line 3—3 of Figure 1.

Referring now in detail to the drawings, the cabinet shown in Figure 1 is of generally rectangular form, and comprises a base portion indicated generally at 5, a top or table portion indicated at 6, and a central paneled portion indicated at 7. The ends of the stand, as shown in Figure 1, comprise a door 8, hinged at 8' to swing outwardly from the end, a drawer 9 disposed above the door 8, a plurality of smaller side drawers 10 disposed above the drawer 9, and a central hinged door 12 between the side drawers 10.

The end of the stand is preferably decorated with a modernistic design, and includes vertically extending rail portions 13 of diamond-shaped section providing drawer pulls and a handle for opening the hinged door 8. In addition, the hinged door 12 is provided with a horizontally extending bar 14 similar to the rails 13, which is provided specifically for opening this door.

The lateral sides of the stand are provided with panel sections 15, which sections are preferably provided with decorative portions providing the appearance shown in Figure 2.

Figure 5:
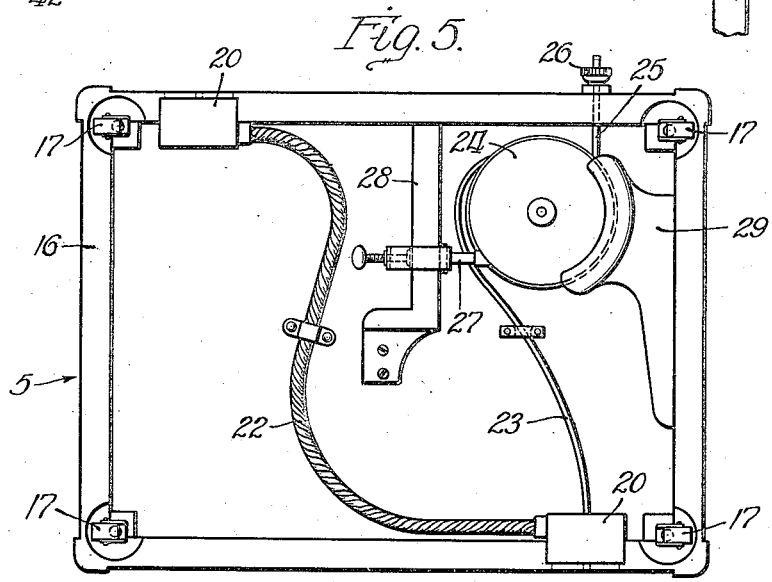
Figure 5 is a bottom plan view of the stand.

Considering now the base portion 5 of the stand, the detail plan view thereof shown in Figure 5 illustrates this base as being comprised of a rectangular frame portion 16, which is provided, at its corners, with casters 17 which are adapted to provide for rolling of the stand into any desired location. Preferably stop members, such as indicated at 19 in Figures 1 and 2, are provided for the purpose of locking the stand in position in any desired location, the plungers of the stop members 19 being pressed downwardly to engage the floor surface when it is desired to lock the stand in position.

In opposite lateral surfaces of the base 5 of the stand, double outlet housings 20 are provided, which housings 20 contain suitable receptacles for engaging a contact plug carried by a flexible conductor or the like for leading current to any desired power operated device. The sockets 20 are connected through the armoured cable 22 mounted in the base member 5, and are preferably connected to the flexible conductor 23 which extends about a reel 24 pivotally mounted for rotation within the confines of the base 5, and having the flexible extension 25 projecting therefrom. The extension 25 has a suitable contact plug member 26 adapted to engage in any suitable wall socket or other electrical connection. Preferably a suitable stop member 27 is provided for limiting the rotation of the reel 24, the stop member being carried upon a bracket 28 mounted within the base 5 of the stand. A reel guard 29 is provided for preventing displacement of the conductor 25 outwardly of the reel.

Considering now the top of the stand, in Figures 1, 2, and 15 this top is shown in detail. The top preferably comprises a pair of leaf members 30, which are hinged at their outer ends, as shown at 32, to a top member 33 extending over the top of the stand. The leaf members, upon opposite surfaces thereof, as well as the top surface of the member 33, are provided, as shown in Figure 9, with a surface layer of "Formite" indicated at 33', or any other suitable surface covering, which may be glued thereto in a press, or similarly secured to the surfaces of the members 30 and 33. This provides a smooth water, acid and heat proof surface for the table top and leaf members, and at the same time provides a covering which may be readily maintained clean and sanitary.

Figure 4:
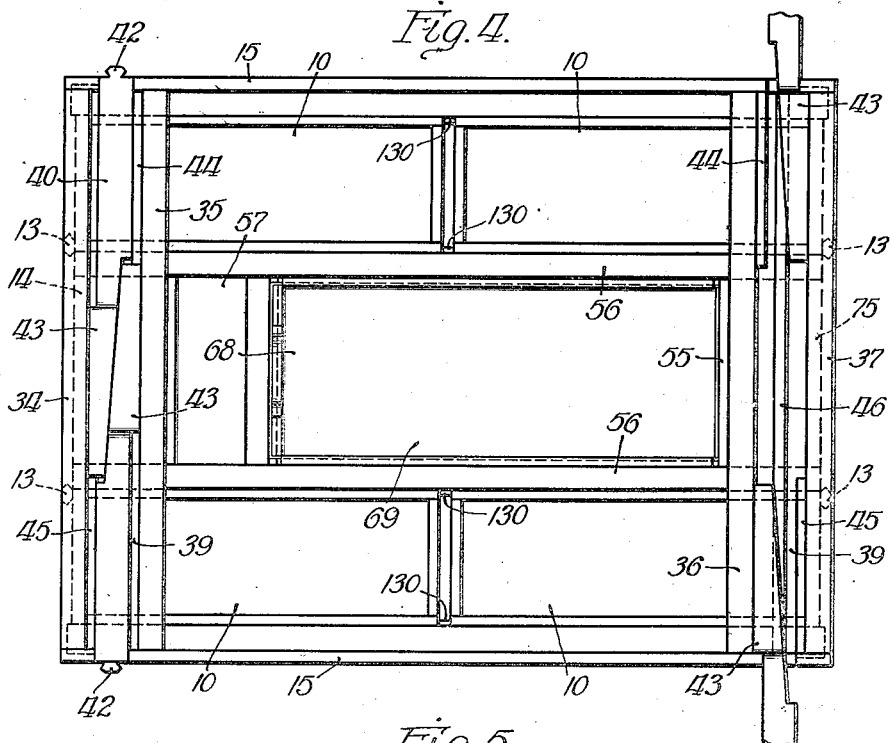
Figure 4 is a horizontal sectional view, taken substantially on the line 4—4 of Figure 2.

Considering now in detail Figures 3 and 4, the top portion of the stand, indicated generally at 6, includes, together with the side panels 15, parallelly spaced laterally extending supporting members or sills 34, 35, 36, and 37. The members 34 and 37 may extend downwardly at the ends of the stand, to form supporting means for the ends of the stand, and are provided, intermediate their ends with lateral extending members 38 engaging the bottom of the transverse sills 35 and 36 to form therein suitable rectangular transverse openings 39 adapted to receive draw bars 40 for supporting the leaves 30 when in extended position.

The draw bars 40 at their outer ends, are provided with pulls 42, of the same general shape as the pulls 13 and 14, by which the bars 40 may be extended outwardly from the side panels 15 in order to support the leaves 30 in extended position.

Each of the bars 40 comprises a supporting portion, which, adjacent its inner end, is provided with a raised portion 43 adapted to engage the inner surface of the panels 15 to limit the outward position of the bars 40. In addition, the portions 43 of the bars are provided with angled lateral surfaces, as shown in Figure 4, to accommodate overlapping of the bars within the channels 39 formed by the sill members 34 and 35. Suitable stop members 44 and 45 are provided in each of the channels for limiting inward movement of the draw bars 40, whereby the draw bars can never be positioned within the panels 15 in such manner that the pulls 42 thereof are not accessible. The bars 40 are adapted to be guided upon suitably formed guide rails 46 mounted upon the upper surface of the transverse supporting members 38, the bottom surface of the bars 40 being grooved to receive therein the raised tongues provided on the guide members 46 whereby the bars are guided for transverse longitudinal movement.

It will be noted from Figures 3 and 15 that the top member 33 of the stand is provided with a central cutout portion indicated at 50, which forms an elongated rectangular opening in the central portion of the top 33 of the stand. Preferably mounted at one end and extending partially across this opening is a closure member 52, which is suitably rabbeted as at 53, to engage a suitable tongue formed on the inner defining surface of the opening 50. This serves to support the member 52 in position coplanar with the top 33, the free end of the member 52 which extends across the opening 50 being rabbeted as shown at 54.

Extending downwardly from the inner defining edge of one end of the opening 50 is a closure member 55, which, together with two side wall portions 56 extending between the ends of the stand, defines a central well, the fourth side of the well being closed by the downwardly and inwardly extending closure member 57 extending from the opposite defining end of the opening 50 downwardly as shown in Figure 3, the bottom of the well being closed by a transverse closure member 58. These members may all be suitably secured in position by gluing or in any other desired manner.

Disposed on the inner surface of the member 57, within the well, is a member 59 having a rabbeted end 60 adapted to engage with the rabbeted end 54 of the member 52, and at its opposite end having a gouged-out portion 62 engaging over the hinge 63 of a base supporting member 64. If it is desired to close the opening 50, in order to provide a smooth table top, the member 59 is positioned across the remaining portion of the opening not covered by the member 52, the two rabbeted ends 54 and 60 engaging to lock the members together, and the member 59 having its end gouged out in order to fit over the hinge 63 of the base member 64, and the base portion 65 of a power operated device indicated generally at 66, which device 66 has its base 67 mounted securely upon the base member 64 for conjoint movement therewith. When it is desired to close the opening, therefore, the member 59 is merely positioned over the remaining portion of the opening, closing the same and providing a smooth table top. Also, a suitable tray member, indicated at 68, is disposed in the base of the well 69 formed by the defining members 55, 56, and 57, and is supported upon the bottom wall 58 of the well, which may be removed from the well and may be cleaned, the tray 68 being provided to catch any food material or the like dripping from the power operated device 66.

Considering now in detail the manner in which the power operated device is mounted in position for operation, in Figure 10 I have shown, in dotted lines, the manner in which the base member 64 is raised in position, whereby its rabbeted end 70 is moved into engagement with the rabbeted end 54 of the member 52.

Thus, when it is desired to use the power operated device 66, the board 52 is removed, the handle 72 of the device is grasped, the device is swung about its pivot 63, the defining end of the member 33 being cut away, as shown at 73, for the purpose of accommodating pivotal movement of the base 64 about the hinge 63, and the device 66 is raised into the position shown in dotted lines in Figure 10. The board 52 is then replaced in position upon the guide tongue of the opening, and the base 64 of the member supporting the device 66 is then reversely rotated to bring the rabbeted ends 70 and 54 into engagement, whereby the base 64 is mounted in horizontal position coplanar with the table top 33. This supports the device 66 in operative position on the top of the table of the stand.

Extending outwardly from the well 69 in which the power operated device 66 is disposed, and defined by the outer surface of the closure member 55, and the hinged door 12 at the end of the stand, is a compartment indicated generally at 75, which compartment is partially closed, at its base, by an extending portion of the bottom wall 58 of the well 69.

Figure 6:
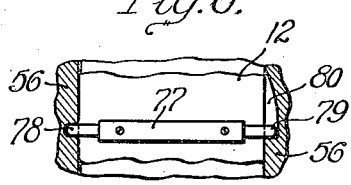
Figure 6 is a detail sectional view of the mounting of one of the hinged doors for the stand.

This compartment may be employed for the purpose of storing miscellaneous articles or the like, such as the keys 76. The hinged door 12, which is shown in detail in Figure 6, has the hinge portion 77 thereof projecting beyond the sides of the door, one end 78 thereof fitting in a suitable socket formed in the member 55, and having its opposite end 79 movable within an arcuate groove 80 formed in the opposite member 56. Thus the door may be moved out of hinged engagement with the stand, if desired.

In the operation of the door, the handle portion 14 thereof may be grasped, and, inasmuch as the hinge 77 is disposed above the lower end of the door, the door is rotated about this portion, and swings into the position shown in dotted lines in Figure 3. The rear surface of the door 12 is adapted to support a memorandum pad 82, or a similar member, and the door, when moved to open position, has its front surface resting upon the top of the front panel of the lower drawer 9 whereby it is supported in an angular position facilitating writing upon the pad 82. If desired, suitable spring closure means 83 may be provided for the purpose of positively maintaining the door 12 in closed position.

The opposite door 12, at the other end of the well 69, closes a compartment 84, in which is disposed a suitable base member 85 carrying a stop member 86 corresponding to a door stop member or the like. Upon the rear face of the door 12 is pivoted a container 87, which is hinged to the door at 88, and which is shown in detail in Figures 12, 13, and 14. The cabinet 87 may contain recipes or other suitable memorandum, and is provided with the customary hinged cover 89, which cover is normally held in closed position by means of a resilient finger member 90.

The door 12 is provided with oppositely extending hinge portions 92, which are adapted to have sliding engagement in angularly extending grooves 93 formed in opposite walls of the partition members 56. Adjacent the upper end of the compartment 84, the grooves 93 have offset portions 94, forming shoulders within which the hinges 92 of the board may be positioned, the lower edge of the door 12, as indicated at 12' bearing against a stop plate member 95 formed on the transverse sill member 38.

In the operation of the door, the handle 14 is grasped, as shown in Figure 3, and the door is pivoted outwardly about the pivot 92, and drawn upwardly in the grooves 93, until the hinges 92 reach the topmost part of the grooves 93, whereby the door assumes the position shown in Figure 12, and is then rotated in a counter-clockwise direction until the end 12' hits the stop plate 95, supporting the door 12 in the position shown. Upon rotation of the container 87 about the hinge member 88, the resilient finger 90 forces the cover 89 into open position, and at the same time the member 87 is moved into the position shown in dotted lines in Figure 12. A suitable stop member 96, carried at the upper end of the door on its inner surface, limits the rotation of the container 87, so that it will assume a normal position with respect to the end of the stand. Recipes or similar information bearing cards contained within the box 87 may then be accessible, and the box preferably is provided with a glass window indicated at 97 in Figures 13 and 14, behind which is disposed a slotted portion 98, so that any desired recipe may be inserted into the slot, and when the box is returned to the position shown in full lines in Figure 12, the recipe will be in a position to be easily readable at the same time that operations are being performed by the mixing device 66. Upon shifting of the projecting pins 92 from the grooves 94 back into the grooves 93, the door is reversed in position, and slides down to the position shown in Figure 3, the resilient finger 90 preventing opening of the cover 89, and the top surface of the cover in addition engaging the stop 86 to hold the same in closed inverted position within the chamber 84. Suitable spring-controlled closure means 99 may be provided in order to maintain the door in closed position, if desired. The door 12 may be removed from engagement within the grooves 93 by angularly cocking it to provide for disengagement of the pins 92, when it is desired to dispose the recipe cabinet in a more convenient position.

Referring now in detail to the lower portion of the stand, shown in section in Figure 3, and in detail in Figures 7, 8, and 11, the opposite ends of the stand are provided with the doors 8, which are hinged at their lower ends to the base portion 16 of the stand by means of hinges 8'. The doors are preferably normally maintained in closed position by the resilient means 100 disposed at the sides and adjacent the top thereof. The doors, together with the bottom surfaces of the drawers 9, which drawers, preferably, are supported upon a rail member 102 for sliding movement inwardly and outwardly with respect to the ends of the stand, form a chamber indicated at 103 with the top surface of the base portion 5 of the stand, this base portion being closed at its top by a planar partition member 104 supported about the periphery of the frame 16, and carrying the bracket members 28 and 29. Mounted upon the base 104 are a plurality of grooved members 105, having longitudinally extending grooves 106 therein. Mounted for sliding movement in the grooves 106 are supporting members 107, 108, and 109. These supporting members have downwardly extending rib portions 110, which are adapted to engage in the grooves 106 for providing sliding movement of the members 107, 108, and 109 inwardly and outwardly of the stand within the grooves. Each of the members 107, 108, and 109 is provided at its ends with handle portions 112, which handle portions are for the purpose of facilitating grasping of the members in order to draw them outwardly of the stand.

The member 107 is adapted to contain thereon a plurality of bracket members 113, which are formed in the manner shown in Figure 3, being stepped downwardly and inwardly to support a plurality of mixing bowls and a fruit juice extractor indicated generally at 114, which are mounted in superposed telescoping relationship within the brackets, and thus supported in spaced relationship upon the member 107. Thus, upon opening the door 8 at the left hand side of the stand, as viewed in Figure 3, and allowing this door to open to its normal horizontal position, as shown in Figure 11, which position is limited by the sliding brace member 115, which is pivoted at its upper end to the side panel 15 of the stand, and at its lower end to brackets 116 carried on the inner surface of the door, the door is dropped to aligned position with the grooved members 105, and upon grasping the handle portion 112 of the member 107, the member 107 can be drawn outwardly, as shown in Figure 11, to provide access to the bowl 114. Preferably a suitable stop member 117 is provided, which is adapted to engage the lower end of the door adjacent the hinge 8' to limit outward movement of the member 112. The inner surface of the door is grooved, as shown at 118, in alignment with the grooves 106 formed in the members 105, to provide for free sliding movement of the members 112 outwardly onto the door surface. Suitable stops, indicated at 120, carried by the panel members 15 are provided for limiting inward movement of the doors 8, in order to provide a true planar surface at the ends of the stand.

In a similar manner, the member 108, at the opposite end of the chamber 103, is adapted to carry thereon suitable appliances which are adapted for use with the device 66. For example, a meat chopping device or a grater is indicated generally at 122, mounted upon brackets 123 and 124 carried by the member 108, and a coffee grinder appliance indicated at 125 is carried upon suitable brackets 126 and 127 mounted upon the member 108. Thereby, upon opening the door 8 at the right hand end of the stand shown in Figure 3, the member 108 may be drawn outwardly along the grooved slides 105 and the grooves 118 in the inner surface of the door, and may thus be moved into a position whereby it is readily accessible by any one operating the device 66, so that these appliances may be used in connection with the device.

The member 109, which is mounted in the same end of the stand as the member 107, is adapted to carry, upon suitable brackets, a power transfer member 128, mounted upon suitable brackets, and is separately movable outwardly at the end of the stand it is desired to gain access to this member without drawing out the bowl 114.

The drawers 9 which extend inwardly substantially to the center of the stand shown in Figure 3 from opposite ends thereof, extend the entire width of the stand, and are carried upon suitable rails 102 mounted on the inner sides of the partitions or panels 15. The drawers 9 may be pulled outwardly by grasping the drawer pulls 13 as shown in Figure 1. These drawers are adapted to contain miscellaneous appliances, such as egg beaters, or other stirring devices adapted to be inserted into the device 66, or any other materials which may be useful in connection with the operation of the device 66 or the use of the stand as a table or the like.

The drawers 10, which extend inwardly from the ends of the stand toward the center thereof on opposite sides of the hinged doors 12, are adapted also to contain suitable miscellaneous articles which may be of use in connection with the utilization of the stand. These drawers 10 are carried upon suitable rails 130 carried on the inner surfaces of the partition members 15 and on the outer surfaces of the centrally extending partition members 56. Corresponding grooves in the side surfaces of the drawers 10 guide these drawers for sliding movement upon the rails 130. The drawers are opened by grasping the pulls 13, as previously described.

It is therefore apparent that I have provided a stand for use in connection with the operation of a power operated device, such as the commonly used "Mixmaster" device, which may be employed for mixing, stirring, or any number of other suitable mechanical operations employed in connection with the preparation of food, by the use of various ancillary appliances which may be connected thereto. The compact and sturdy construction of the stand, as well as the utilization of the well as a chamber for supporting the mixing device when it is not in operation, which well may be closed by suitable members forming a table surface, which table surface may be used for eating purposes or the like, provides a stand of exceptional utility.

In addition, by the provision of a particular arrangement of compartments at the ends of the well, I am enabled to provide means for readily disposing memorandum or recipe information adjacent to the place of operation of the device, so that use of the device is facilitated.

In addition, the present invention contemplates the provision of means whereby all the auxiliary ancillary apparatus which is to be employed in connection with the power operated device is carried by the stand, and supported therein, and is readily accessible for use, as desired.

Having described my invention in accordance with the patent statutes, what I claim and desire to secure by Letters Patent is:

1. A portable kitchen stand for a power operated food and drink mixer and its accessories, comprising a top portion, a base portion, and an intermediate portion, a centrally located well extending from the top portion downwardly into said intermediate portion and having an end wall hinged at its upper end forming a support adapted to carry said mixer and movable into alinement with said top portion for operation of said mixer, side partitions spaced inwardly from the side walls of said stand and extending the full width thereof defining opposite lateral sides of said well and having means on the outer surfaces forming, with corresponding means on the inner surfaces of said side walls, drawer supports for drawers movable inwardly and outwardly of the end of said stand between each of said partitions and the cooperating side wall and adapted to contain accessories for use with said mixer, transverse partitions between said side partitions spaced inwardly of the ends of said side partitions and defining on their inner surfaces opposite end walls of said well and on their outer surfaces cooperating with the extending portions of said side partitions to form compartments adapted to contain memoranda and the like and opening out of the ends of said intermediate portion at opposite ends of said well and between said drawers, horizontally hinged doors closing the open ends of said compartments, and a bottom wall closing the bottom of said well and extending into the end compartments between said side partitions.

2. A portable kitchen stand for a power operated food and drink mixer and its accessories comprising a top portion of generally rectangular shape having extension leaf members hinged to opposite edges thereof and normally folding over said top portion, transverse channels at opposite ends of said stand beneath said top portion, transversely slidable support members in said channels movable outwardly of said channels to support said extension members in opened position, a downwardly extending well in said top portion defined at its ends by transverse downwardly extending partition members disposed inwardly of said transverse channels, side partitions spaced inwardly of the side walls of said stand defining the sides of said well and extending from end to end of said stand, said side partitions defining, with said transverse partitions, compartments below said transverse channels opening out of the ends of said stand at opposite ends of said well, and hinged doors disposed in the planes of the ends of said stand below the outer defining surfaces of said channels for closing said compartments.

LOUIS L. MATANOVICH.